US012330808B2

(12) United States Patent
Gil

(10) Patent No.: US 12,330,808 B2
(45) Date of Patent: Jun. 17, 2025

(54) MODULAR UNMANNED AERIAL VEHICLE SYSTEM FOR ADAPTABLE PARCEL DELIVERY

(71) Applicant: United Parcel Service Of America, Inc., Atlanta, GA (US)

(72) Inventor: Julio Gil, Veldhoven (NL)

(73) Assignee: UNITED PARCEL SERVICE OF AMERICA, INC, Atlanta, GA (US)

( * ) Notice: Subject to any disclaimer, the term of this patent is extended or adjusted under 35 U.S.C. 154(b) by 0 days.

(21) Appl. No.: 18/467,560

(22) Filed: Sep. 14, 2023

(65) Prior Publication Data
US 2024/0002077 A1 Jan. 4, 2024

Related U.S. Application Data

(63) Continuation of application No. 17/216,916, filed on Mar. 30, 2021, now Pat. No. 11,794,931.

(51) Int. Cl.
*B64U 20/40* (2023.01)
*B64D 9/00* (2006.01)
(Continued)

(52) U.S. Cl.
CPC ............... *B64D 9/00* (2013.01); *B64U 10/14* (2023.01); *B64U 10/25* (2023.01); *B64U 20/40* (2023.01);
(Continued)

(58) Field of Classification Search
CPC ...... B64U 30/291; B64U 30/14; B64U 20/40; B64U 30/292
See application file for complete search history.

(56) References Cited

U.S. PATENT DOCUMENTS

| 9,630,712 | B1 | 4/2017 | Carmack et al. |
| 9,969,495 | B2 | 5/2018 | Gil |

(Continued)

FOREIGN PATENT DOCUMENTS

| CN | 108284958 A | 7/2018 |
| CN | 108725775 A | 11/2018 |

(Continued)

OTHER PUBLICATIONS

Office Action and Search Report received for Chinese Application No. 202180027078.0, mailed on Apr. 11, 2025, 25 pages (18 pages of original office action and 7 pages of English Translation).

*Primary Examiner* — Brady W Frazier
*Assistant Examiner* — Shanna Danielle Glover
(74) *Attorney, Agent, or Firm* — Shook, Hardy & Bacon L.L.P.

(57) ABSTRACT

A modular unmanned aerial vehicle (UAV) system comprises a body module, a rotor module, and a wing module. The body module includes a flight controller and a power distribution device. The body module is releasably attachable to the rotor module or the wing module, and the body module is releasably attachable to the rotor module. The rotor module includes one or more motors and electronic speed controllers (ESCs), while the wing module includes a wing having a flap, elevator, aileron, or rudder. Various UAV configurations can be formed from the body module, the rotor module, and the wing module. Each configuration includes different advantages for flight time, distance, battery life, and payload capacity. A UAV can be configured to a particular configuration to optimize parcel delivery.

15 Claims, 11 Drawing Sheets

Related U.S. Application Data

(60) Provisional application No. 63/004,283, filed on Apr. 2, 2020.

(51) Int. Cl.

| | | |
|---|---|---|
| *B64U 10/14* | (2023.01) | |
| *B64U 10/25* | (2023.01) | |
| *B64U 30/10* | (2023.01) | |
| *B64U 30/14* | (2023.01) | |
| *B64U 30/291* | (2023.01) | |
| *B64U 50/34* | (2023.01) | |
| *B64U 70/20* | (2023.01) | |
| *B64U 30/26* | (2023.01) | |
| *B64U 50/19* | (2023.01) | |
| *B64U 50/36* | (2023.01) | |
| *B64U 101/64* | (2023.01) | |

(52) U.S. Cl.
CPC ............ *B64U 30/10* (2023.01); *B64U 30/14* (2023.01); *B64U 30/291* (2023.01); *B64U 50/34* (2023.01); *B64U 70/20* (2023.01); *B64U 30/26* (2023.01); *B64U 50/19* (2023.01); *B64U 50/36* (2023.01); *B64U 2101/64* (2023.01); *B64U 2201/20* (2023.01)

(56) References Cited

U.S. PATENT DOCUMENTS

| | | | |
|---|---|---|---|
| 2016/0129998 A1* | 5/2016 | Welsh | B64C 27/20 |
| | | | 244/12.3 |
| 2016/0244160 A1 | 8/2016 | Colten et al. | |
| 2017/0313422 A1 | 11/2017 | Gil | |
| 2018/0186464 A1 | 7/2018 | Woodworth et al. | |
| 2018/0273158 A1* | 9/2018 | Courtin | B64C 39/024 |
| 2019/0106192 A1 | 4/2019 | Woodworth et al. | |
| 2020/0140087 A1 | 5/2020 | Fulbright | |
| 2021/0001700 A1* | 1/2021 | Fisher | B64C 27/00 |
| 2021/0197965 A1 | 7/2021 | Kunz et al. | |
| 2021/0309353 A1 | 10/2021 | Gil | |

FOREIGN PATENT DOCUMENTS

| | | |
|---|---|---|
| CN | 209396039 U | 9/2019 |
| CN | 110621250 A | 12/2019 |
| WO | 2018/175694 A1 | 9/2018 |

* cited by examiner

MODULAR UNMANNED AERIAL VEHICLE SYSTEM FOR ADAPTABLE PARCEL DELIVERY

CROSS-REFERENCE TO RELATED APPLICATIONS

This application is a continuation of U.S. application Ser. No. 17/216,916, filed Mar. 30, 2021, and entitled "A Modular Unmanned Aerial Vehicle System for Adaptable Parcel Delivery," which claims priority to U.S. Provisional Application No. 63/004,283, filed Apr. 2, 2020, and entitled "A Modular Unmanned Aerial Vehicle System for Adaptable Parcel Delivery," each of which is expressly incorporated by reference in its entirety.

BACKGROUND

Parcel delivery has historically used ground-based delivery vehicles. Aerial-based delivery has historically included moving a large number of parcels using a manned aircraft to an intermediate destination, where the parcels are divided into groups and then delivered using traditional ground-based delivery vehicles. Only recently, with the introduction of smaller unmanned aerial vehicles (UAVs), has parcel delivery included using unmanned aerial-based delivery methods for delivering parcels to a final destination.

SUMMARY

At a high level, aspects described herein relate to a modular UAV system. One example modular UAV system, among others that will be further described, comprises a body module, a rotor module, and a wing module. The body module includes a battery area, and on-board computing system, a power distribution device, and can include all or part of the modular UAV's landing gear and parcel carrier. The body module is releasably attachable to a rotor module or a wing module, where the rotor module includes one or more motors and ESCs, while the wing module includes a wing having an airfoil. In other example configurations, the rotor module and the wing module may also have their own battery area, onboard computing system, and power distribution device, or any combination of these. In various configurations, the rotor module and the wing module act as components of a bigger UAV system, or may operate independently as fully operative UAVs.

Using these system components, various UAV configurations can be formed. In a configuration, the body module is secured to the rotor module. Here, the UAV acts as a typical helicopter or multirotor vehicle, allowing it to take advantage of vertical takeoff and landing (VTOL) and better maneuverability in smaller or obstructed areas. The body module can be secured to rotor modules of various sizes to include payload capacity. In another configuration, the body module is secured to the wing module, allowing the UAV to take on forward flight advantages, such as distances and reduced power demands. Another arrangement includes the body module, the rotor module, and the wing module, which provides benefits from both designs.

This summary provides one example of the technology that will be described, and it is intended to introduce only a selection of concepts in a simplified form that is further described in the Detailed Description section of this disclosure. The Summary is not intended to identify key or essential features of the claimed subject matter, nor is the Summary intended as an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
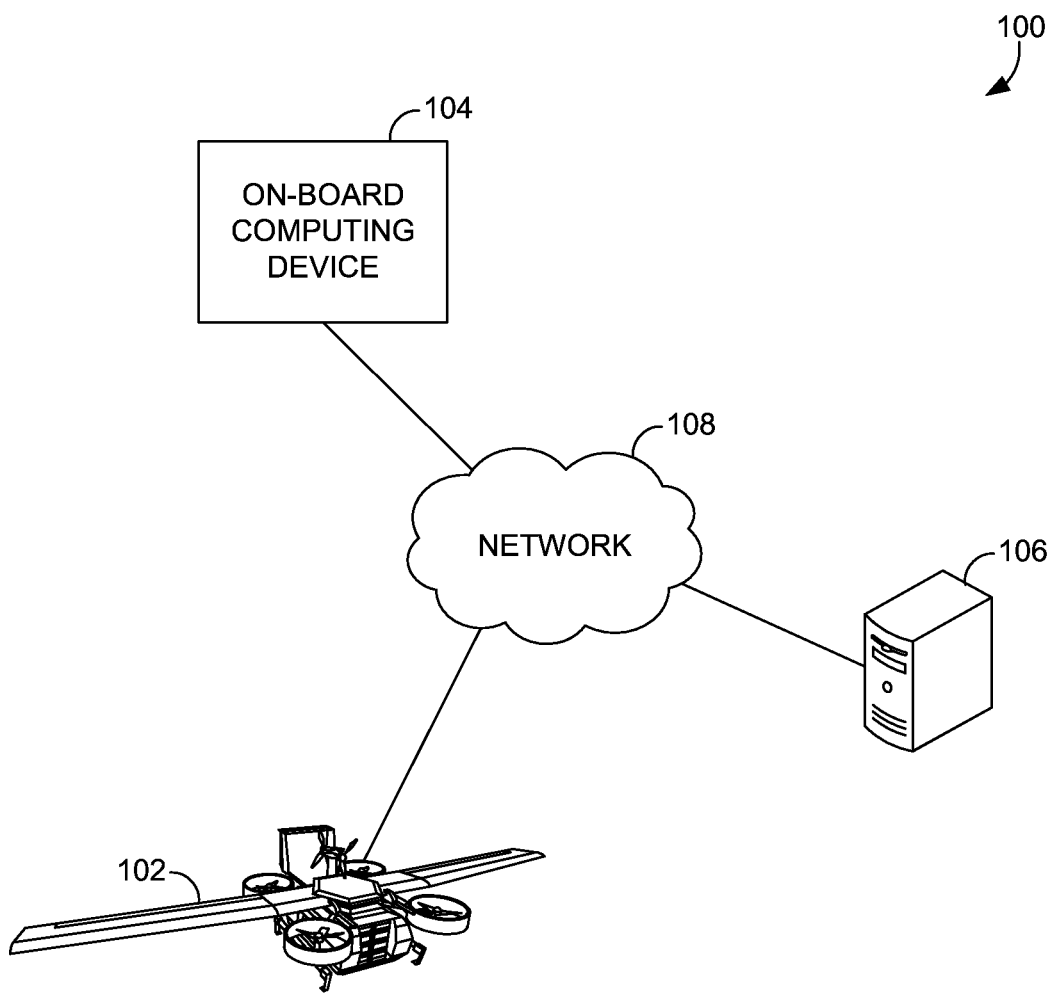
FIG. 1 is an example modular UAV system operating environment, in accordance with an aspect described herein.

Traditional UAVs are designed to operate as a single unit. That is, UAVs historically include an area that houses an on-board computing system and a power distribution device. This area is generally integrated into a frame. The frame also includes arms having motors attached at the opposite end of the frame arms. Some of these UAVs also include wings for forward flight.

These conventional UAV systems are not designed to include a modular framework having various interchangeable and scalable modules that allow for different configurations of the UAV. Thus, when using conventional UAVs, different UAVs are sometimes required to accomplish different tasks. In particular, when delivering parcels using UAVs, a conventional UAV is selected based on its range and payload capacity when tasked with delivering a parcel, since the weight, size, and delivery location will vary for each parcel.

This leads to a problem when using UAVs to deliver parcels, particularly with the last-mile delivery scenario. Here, it is generally not feasible to select from various available UAV options when tasked with making a delivery. For example, when a UAV is used in conjunction with a ground delivery vehicle, it is not feasible to transport different UAVs for different scenarios. Likewise, at a facility, storing different types of UAVs uses a large amount of space, and it limits the number of UAVs of one type that can be maintained and used at any given time.

To solve these and other problems in the field, the technology provided herein describes a modular UAV system that is adaptable to various delivery scenarios, including parcel size, weight, and delivery distance. One example modular UAV system comprises a body module, a rotor module, and a wing module. The body module comprises a battery location, a power distribution device, and an onboard computing system, such as a flight controller. The body module also comprises navigation sensors for the UAV system, which communicate to the onboard computing system. Each of these components can be provided within a body housing.

The body module is releasably attachable to the rotor module or the wing module. The body module housing comprises a body connection member that is releasably attachable to a rotor connection member of the rotor module. The rotor module comprises a rotor connection hub that includes the rotor connection member. The rotor connection hub comprises arms extending from the rotor connection hub to motors. The rotor module further comprises electronic speed controllers (ESCs) controlling the motors. ESCs are in communication with the power distribution device and the on-board computing device through a releasable cable connector located at the body connection member and the rotor connection member.

The rotor module is releasably attachable to the wing module using a second rotor connection member at the rotor connection hub and a wing connection member at the wing module. The wing module comprises a wing that assists in forward flight of the modular UAV system through an airfoil. Various wing components are operable through communication with the on-board computing device of the body module. A releasable cable connector is provided at the second rotor connection member and the wing connection member to establish this communication when the wing module is secured to the rotor module.

The wing module is further releasably attachable to the body module using the wing connection member and the body connection member. Communication from the on-board computing device at the body module is established to the wing components of the wing module through a releasable cable connector provided at the wing connection member and the body connection member.

Thus, the modular UAV system can be arranged in multiple configurations for optimal parcel delivery. A configuration includes the body module secured to the rotor module. Another configuration includes the body module member directly secured to the wing module. Yet another configuration includes the body module secured to the rotor module, and the rotor module being secured to the wing module.

Various arrangements provide different advantages, thus making the modular UAV systems adaptable to solve many of these problems. For example, some rotor modules include larger motors relative to other rotor modules. This allows larger motors to be easily selected for larger payload capacities, and smaller motors to be selected with lower payload capacities, which reduces power demands and increases range. Wing components of various lengths can be added to the arrangement to gain the advantage of forward flight lift, which reduces power requirements and increases range, while trading off low-altitude, low-speed maneuverability. Any combination of these components can be selected to provide advantages specific to a particular parcel delivery.

Turning now to FIG. 1, an example unmanned UAV system operating environment ("operating environment") 100 is illustrated. As shown, operating environment 100 includes UAV 102, on-board computing system 104, and server 106. Each communicates using network 108.

Network 108 encompasses any form of wired or wireless communication. This can include one or more networks, such as a public network or virtual private network "VPN." Network 108 may include one or more local area networks (LANs) wide area networks (WANs), or any other communication network or method. Network 108 includes any frequency band for wireless communication between components. Network 108 is intended to include any method for wireless communication, including satellite-based communication methods or any other over-the-horizon-type communication methods, such as telecommunication bands (LTE, 4G, 5G, etc.).

UAV 102 illustrates one example of a modular UAV system, and includes any of the modular UAV systems described herein. While illustrated as one UAV, UAV 102 may represent a plurality of UAVs. Further, although it is illustrated here and throughout as a four-rotor VTOL aircraft, UAV 102 may include any number of rotors, such as a single rotor helicopter or another configuration of multi-rotor vehicle, or may be embodied as a fixed-wing aircraft, or some combination of both.

UAV 102 may comprise one or more sensors to assist in navigation and parcel delivery. Generally, sensors collect data and communicate the data to onboard computing device 104 or server 106.

Some examples sensors include barometers that measure air pressure; accelerometers that determine changes in position and movement; GPS (or any other satellite-based system) receiver that determines or communicates location, altitude, position, velocity, among other items; magnetometers that determine heading; range finders that determine a distance between two objects, including UAV 102, and include lasers, sonar, and the like; optical cameras that collect visual information, and receivers that receive wireless information, such as flight instructions or commands. These are only some examples, since it is impractical to describe every usable sensor, and it will be recognized that the inventors intend usability of any sensor.

Sensors may be coupled to any of the modules described herein or may be attached to sensor sockets in each of the modules (wing module, rotor module or body module.) When releasably attached to a module, the sensor can be automatically identified and enabled by the central computing unit and selectively powered from any available battery, located on any of the modules. This allows for an efficient payload management of the UAV by onboarding only those sensors required for each mission.

Sensors may operate to determine information individually or in combination with other sensors. These sensors may work in conjunction with software programs and computing systems to, among other things, engage in obstacle avoidance to increase UAV safety, navigate UAV 102 to a location autonomously or under the assistance of a human pilot, release and pickup parcels for delivery, and identify or confirm the identity of a recipient or sender. In one particular example, sensors that do not collect visual information can be used to perform any of these functions to preserve the privacy of recipients and senders when using UAVs to deliver parcels.

UAV 102 comprises on-board computing device 104. An example of on-board computing device 104 includes a flight controller. Various flight controllers are available for use with UAV 102. One of ordinary skill in the art will have an understanding of the availability and benefits of such flight controllers.

Though represented as a single component, on-board computing device 104 can be distributed in nature. That is, one or more functions may be performed by a single component or by a plurality of components distributed throughout UAV 102. On-board computing device 104 generally includes a processor that executes instructions stored on computer memory. An example includes computing device 900 of FIG. 9.

On-board computing device 104 may comprise or communicate with sensors utilized by UAV 102. For example, on-board computing device 104 receives input signals from a receiver, processes the input signals, and then communicates instructions to various components of UAV 102, such that the UAV operates in accordance with the input signals. For example, on-board computing device 104 may release or retrieve parcels using a parcel carrier based on received sensor information or other remotely received instructions.

On-board computing device 104 may include pre-programmed instructions in addition to processing received input instructions. An example includes default safety instructions that are executed upon detecting a certain event. For example, on-board computing device 104 can navigate UAV 102 to a defined location in the event communication signals are lost or damage is detected; it may execute safety mechanisms, such as parachutes, if certain altitude inputs are received or if battery power depletes below safe levels; it may maneuver UAV 102 to avoid obstacles, such as aircrafts, buildings, and people, or execute any other safety protocol in response to an event.

UAV 102 may comprise ESCs. Electronic speed controllers generally regulate the speed and spin direction for electric motors. Electronic speed controllers receive an input signal from on-board computing device 104 and adjust the electric motors of UAV 102 accordingly. An ESC can be provided for each motor included in UAV 102. The ESCs can be consolidated into a single component or distributed about UAV 102. They may be independent from or integrated with on-board computing device 104.

Motors can include any type of electric motor or non-electric powered motor. However, generally, an electric motor is used in combination with the ESCs. Electric motors may include brushed direct current (DC) motors or brushless DC motors. Motor size may vary to provide greater levels of thrust for UAV 102, thereby increasing payload capacity. Generally, an increase in motor size increases the amount of current the motor will draw. This places higher demands on ESCs. As such, ESC selection is dependent on motor size, and may further be dependent on propeller size, battery voltage and UAV weight, including a load, such as a parcel.

UAV 102 may comprise a power distribution device that distributes power from a battery, or other power source 207, to the various components of UAV 102, such as sensors, ESCs, and on-board computing device 104. The power distribution device may be a single component, or integrated into a component that includes ECSs and on-board computing device 104.

Server 106 generally includes a computing device that is not integrated onto UAV 102, but may remotely communicate to UAV 102 and on-board computing device 104 using network 108, for example, by wirelessly transmitting to a receiver on-board UAV 102. Server 106 may include a single server having a processor and memory, or a plurality of distributed servers. One example server suitable for use is computing device 900 of FIG. 9.

Server 106 can include a logistics server that remotely provides delivery instructions to UAV 102 to release or retrieve a parcel. Server 106 can provide navigation information to on-board computing device 104, such as a delivery coordinate or route instructions, where on-board computing device 104 navigates UAV 102 to the received delivery coordinate or along the instructed route. Server 106 may operate to directly control the navigation of UAV 102 by determining and providing instructions automatically, by receiving inputs from a human operator and communicating the received inputs to UAV 102, or a combination of both. Additionally, server 106 is operable to control more than one UAV. In a specific example embodiment, server 106 may control up to ten UAVs simultaneously.

Figure 2A:
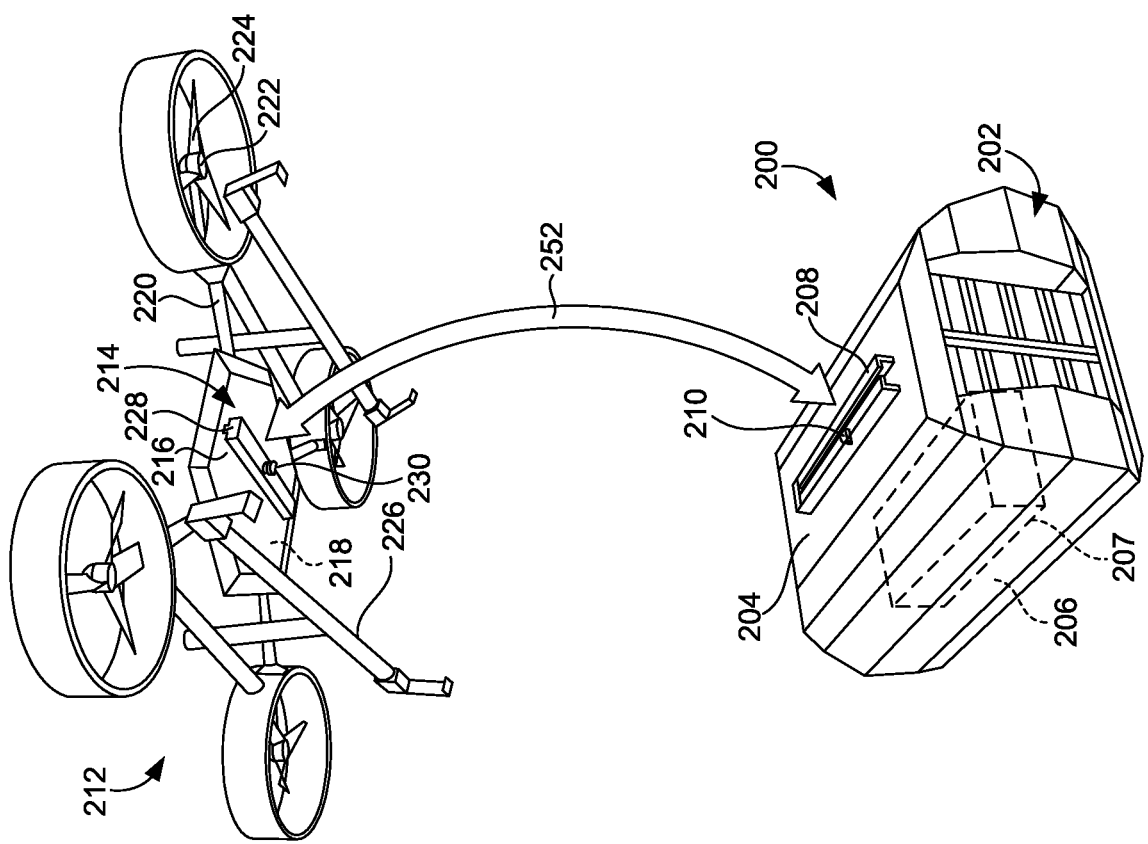
FIGS. 2A-2C illustrate example modules of an example modular UAV system; in accordance with an aspect described herein.
Figure 2B:
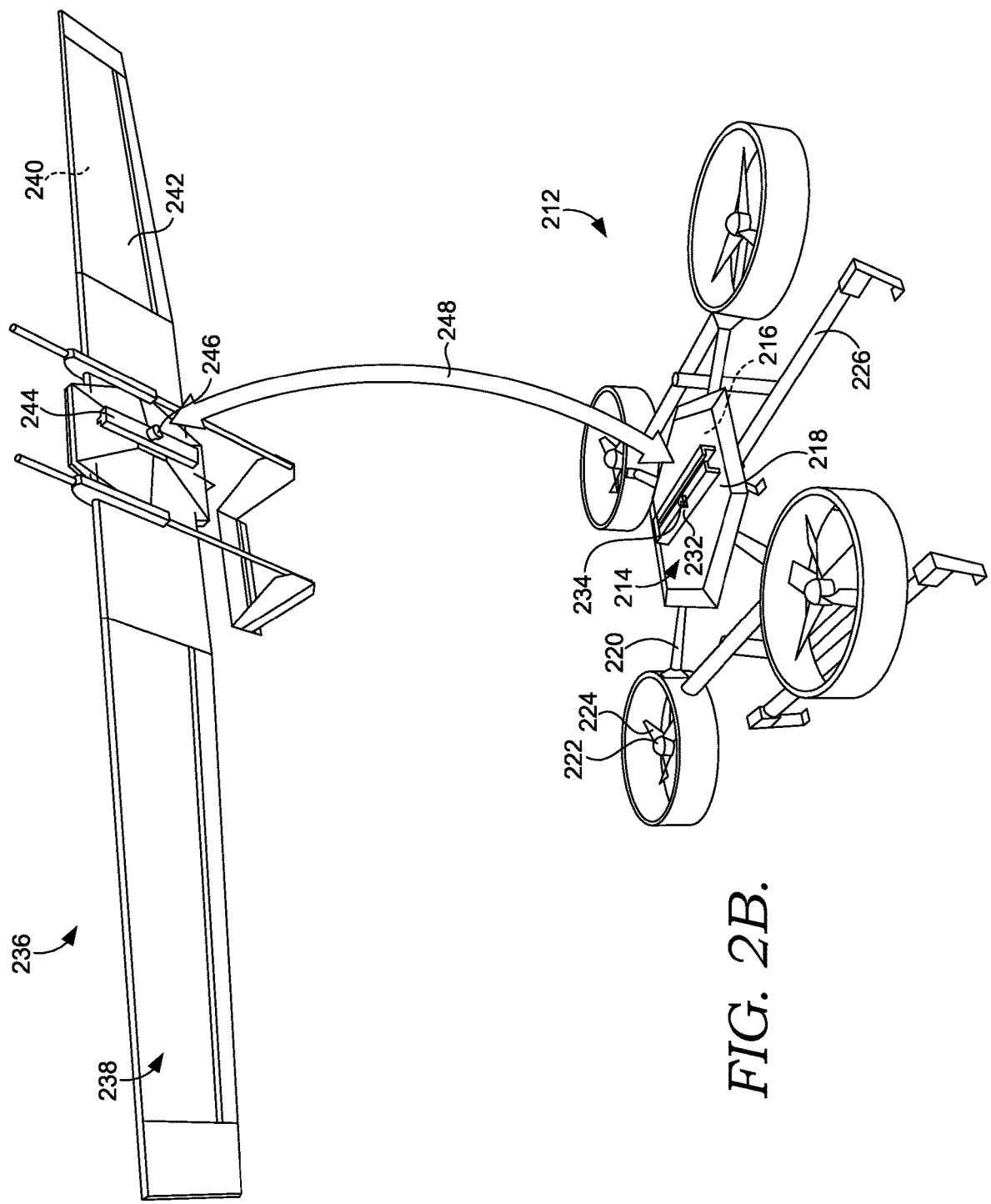
Figure 2C:
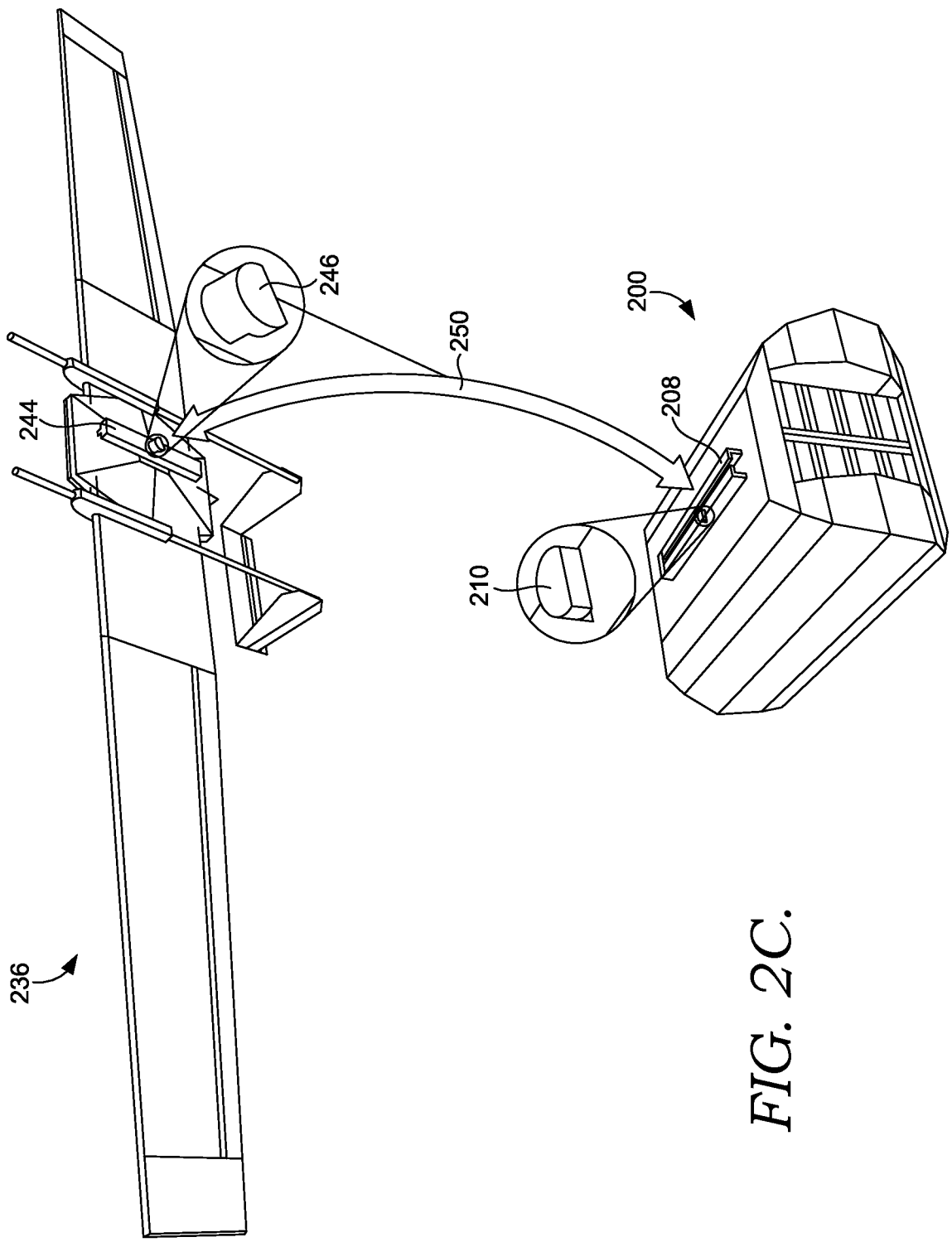

Turning now to FIGS. 2A-C, example modules of an example modular UAV system are illustrated. Starting with FIG. 2A, body module 200 is provided. Body module 200 comprises body housing 202.

Various arrangements of components exist with respect to the modular UAV system. One example arrangement includes a power distribution device and an on-board computing device disposed within body housing 202.

Transmitting and receiving components used for communication can be located within body housing 202 or external to body housing 202, and are in communication with the on-board computing device within body housing 202.

In some cases, body housing 202 comprises material transparent to communication frequencies utilized by network 108 of FIG. 1, particularly where communication receivers are located within body housing 202. In an arrangement, communication transmitters on-board may be located externally to body housing 202, and body housing 202 material may be selected to be opaque or near opaque to the transmitted frequency so as not to interfere with other components included in body housing 202.

Body housing 202 can comprise a battery area so that a battery may be secured on or within body housing 202. In another arrangement, battery area can be an external portion of body housing 202. The battery may be fixed within the battery area or releasably secured to the battery area. When fixed, a charging port may be utilized. While when releasable, the battery may be charged while secured to the battery area or charged separately when detached from the battery area.

While not illustrated on body module 200, body module 200 may include landing gear or a parcel carrier, which in some cases, is combined into a single component.

As illustrated in FIG. 2A, body housing 202 comprises first body housing side 204 and second body housing side 206. Body connection member 208 is included on first body housing side 204. While body connection member 208 is illustrated as a separate component, body connection member 208 can also be integrated into first body housing side 204.

Generally, body connection member 208 comprises all or part of a releasable mechanism. As shown in FIG. 2A, body connection member 208 is a track that is part of a track-and-rail lock system. Any releasable mechanism may be used, in addition to or in lieu of the track-and-rail lock system. Releasable mechanisms include a first portion that secures to a second portion, such that the first and second portions are released using a particular action. Some additional examples include channel locking systems, tension locks, bolt systems, electronic locks, spring lock systems, magnetic locking systems, slide locks systems, clamps, ball locks, threaded locking systems, and male-female locking system, among others.

Body module 200 additionally comprises first releasable cable connection joint 210. As illustrated, first releasable cable connection joint 210 is shown located at body connection member 208. Generally, however, first releasable cable connection joint 210 can be located at any point on body module 200. In another example, first releasable cable connection joint 210 is located on first body housing side 204 and is not integrated with body connection member 208. In another example, first releasable cable connection joint 210 is external to body housing 202 and communicates with components within body housing 202 using a hardwired communication channel.

First releasable cable connection joint 210 comprises all or part of a releasable cable connection system. Generally, releasable cable connection systems include first and second connection members that, when connected, allow communication between a cable associated with the first connector and a cable associated with the second connector. Cables include any physical communication channel, such as copper wire, fiber optic cable, and the like. Some example cable connection systems suitable for use include snap connectors, screw connectors, click connectors, push connectors, pin-and-socket connectors, and male-female connectors, among others.

FIG. 2A additionally illustrates rotor module 212. Rotor module 212 comprises rotor connection hub 214 that has a first hub side 216 and a second hub side 218. Second hub side 218 is opposite first hub side 216.

Rotor connection hub 214 is coupled to a plurality of motors, such as motor 222. The motors may be coupled to rotor connection hub 214 using a plurality of arms that extend outward at a first end from rotor connection hub 214 to a second end. The motors can be coupled to the second ends of the arms, such as the aspect illustrated in FIG. 2A, having arm 220 extending outward from rotor connection hub 214 from a first end toward a second end having motor 222 with propeller 224. In general, rotor module can include any number of motors or propellers, which are recognized automatically by the connection hub which is able to adjust flight parameters accordingly. For example, rotor module may be in the configuration of a helicopter, having one propeller or motor, or may include a plurality of propellers and motors in any arrangement, and each of these propellers and motors are automatically recognized by the connection hub which can adjust flight parameters for the motors and propellers.

Rotor connection hub 214 of rotor module 212 can be configured to receive various arms having different lengths at arm sockets provided on rotor connection hub 214, not illustrated. The number of arms and rotors can be scaled up or down by adding or removing components (arms with rotors and ESCs) into these sockets. For instance, rotor connection hub 214 may be equipped with eight arm socket. In such case, any number of arms may be attached to the sockets to enable flight. For instance, three, four, or six arms can be inserted into various sockets, providing different configurations that enable flight using the three, four, or six arms. As will be recognized, any number of sockets and arm arrangements may be used. In some cases, each of the arms are automatically identified and enabled by the central computing unit and powered from the rotor module battery or the body module battery selectively.

Rotor module 212 can comprise ESCs. Rotor module 212 can comprise a plurality of ESCs, where each motor of rotor module 212 is associated with one of the plurality of ESCs. In this example arrangement, it can be beneficial to provide the ESC s at rotor module 212 so that the ESCs can be preselected based on motor size. Thus, a particular rotor module can be selected based on payload requirements, where rotor modules having larger motors can be selected when greater payload capacity is required for delivering a parcel. Likewise, when less payload capacity is required, a different rotor module can be selected with smaller motors. By having the ESCs at the rotor module, the ESCs do not have to be changed when switching between rotor modules having different motor sizes. In another embodiment, rotor module 212 operates independently, as will be further discussed.

As illustrated in FIG. 2A, rotor module 212 comprises landing gear and parcel carrier 226. Landing gear and parcel carrier 226 is shown as a single component, but may be embodied as multiple components in some configurations. Although shown coupled to rotor module 212, landing gear and parcel carrier 226 may be coupled to any other component of a modular UAV system, including being distributed in parts among different components or modules of the modular UAV system.

Rotor module 212 is further illustrated as comprising first rotor connection member 228. First rotor connection member 228 is coupled to first hub side 216. While first rotor connection member 228 is shown as a separate component, it may be integrated into first hub side 216 or rotor module 212 as a single element.

First rotor connection member 228 comprises all or a part of a releasable mechanism, such as those previously described. As shown, first rotor connection member 228 comprises a rail of the track-and-rail system. First rotor connection member 228 may comprise a first part of a releasable mechanism that releasably couples to a second part of the releasable mechanism that forms body connection member 208 of body module 200.

Rotor module 212 can be releasably secured to body module 200. In the example provided by FIG. 2A, rotor module 212 is releasably secured to body module 200 by coupling the rail of first rotor connection member 228 to the track of body connection member 208, illustrated using first arrow 252.

Rotor module 212 additionally comprises second releasable cable connection joint 230. Second releasable cable connection joint 230 comprises all or part of a releasable cable connection system, such as those previously described. While second releasable cable connection joint 230 is illustrated as part of first rotor connection member 228, it can be placed at any location on rotor module 212.

When rotor module 212 is secured to body module 200, communication can be established between components of rotor module 212 and body module 200 by connecting first releasable cable connection joint 210 to second releasable cable connection joint 230. Thus, continuing with a previous example, ESCs of rotor module 212 communicate with a battery located in the battery area of body module 200 using the power distribution device, and communicate with the on-board computing device within body housing 202.

Turning now to FIG. 2B, a different orientation of rotor module 212 is illustrated. Rotor module 212 comprises rotor connection hub 214 that has second hub side 218. First hub side 216 is opposite second hub side 218. For reference, FIG. 2B also illustrates arm 220, motor 222, and propeller 224 of rotor module 212.

Second hub side 218 is shown comprising second rotor connection member 232. Though shown as a separate component, second rotor connection member 232 may be a single component integrated with second hub side 218. Second rotor connection member may be all or part of a releasable mechanism, such as those previously described.

As shown in the example provided by FIG. 2B, second rotor connection member 232 is a track of the track-and-rail connection system.

Second hub side 218 further comprises third releasable cable connection joint 234. Third releasable cable connection joint 234 comprises all or part of a releasable cable connection system, such as those previously described. As illustrated, third releasable cable connection joint 234 is shown integrated with second rotor connection member 232. However, releasable cable connection joint 234 may be placed anywhere on rotor module 212.

FIG. 2B further illustrates example wing module 236. Wing module 236 comprises wing 238. As illustrated, wing module 236 comprises more than one wing. However, wing modules suitable for use in this technology may include any number of wings, including a single wing, two wings, or more than two wings. Each of these wings can include any combination of wing components, as will be discussed. In further embodiments, the wings may have variable configurations capable of changing shape and angle based on the current or desired speed.

Wing module 236 can be configured to receive a variety of wings and wing components that releasably secure to wing module 236. Recessed sockets at wing module 236 can be configured to receive a corresponding extension on a wing. In this way, wing module 236 can be outfitted with a variety of wings of different sizes and designs, which allow for more advanced UAV configurations. Benefits from these systems include the ability to easily and rapidly adjust a modular UAV's Maximum Take Off Weight, payload capacity, speed, range, and the like to tailor it to specific needs.

Wing module 236 can be configured to receive various wings having different designs, such as type, size, length, etc. of the wing. The various wing designs can be interchangeable added to wing module 236 at wing sockets provided on wing module 236, not illustrated. The number of wings can be scaled up or down by adding or removing components (wing with rotors and ESCs) into these wing sockets. For instance, wing module 236 may be equipped with four wing socket. In such cases, any number of wings may be attached to the wing sockets to enable flight. For instance, two or four wings can be inserted into various sockets, providing different configurations that enable flight. The wing sockets may be in pre-determined locations so as to receive different wing types that require specific positions on wing module 236. As will be recognized, any number of wing sockets in various configurations. In some cases, each of the wings are automatically identified and enabled by the central computing unit and powered from the wing module battery or the body module battery selectively.

A flight controller housed within wing module 236 or any other module, can identify a particular type of wing, including size and design, such as number and type of available motors and sensors attached, battery size and charge status (if one is present), and wing design. For instance, a particular wing can comprise storage media storing computer-readable information that identifies the wing, including size and design. It may include other specifications regarding the wing, such as weight, lift capacity, component configurations (flaps, elevators, ailerons, rudder, etc.), type and number of motors, and the like. When the wing is connected to wing module 236, a communication bus can be physically connected to establish communication between the wing's storage media and the flight controller, allowing the flight controller to identify the wing and its specifications. In another embodiment, wireless communication between the wing and wing module 236 can be used to transfer information about the wing. Upon identifying the wing and its specifications, the flight controller may reconfigure flight parameters according to the weight, power, type and number of wings, type and number of motors, and so on, so that the flight controller adjusts the modular UAVs behavior accordingly. For example, if smaller wings are replaced with relatively larger wings, the flight controller identifies the larger wings and adjust to the different drag and gliding characteristics, as well as the different wing components.

Wing 238 comprises a first wing side 240 opposite a second wing side 242. In this example, first wing side 240 is an upper surface of wing 238 and second wing side 242 is a lower surface of wing 238 when the wing is in a flight position.

While not illustrated in the example embodiment provided by FIG. 2B, wing module 236 may comprise a motor and propeller combination, or a plurality of motors and propeller combinations. The motor and propeller combination may also be used in conjunction with wing modules that operate independently, as will be further described. This allows wing module 236 to engage in flight without the assistance of rotor module 212 and to assist in flight when secured to rotor module 212. In some embodiments, the motor and propeller combination used by wing module 236 is releasably secured to wing module 236 so that it can easily be removed and replaced, or any variation or number can be included in any configuration. The removable motor and propeller combination may comprise specifications that are the same as motor 222 and propeller 224 of rotor module 212, which may also be removably secured to rotor module 212. Thus, the motor and propeller combination of wing module 236 may be interchangeable with motor 222 and propeller 224 of rotor module 212.

Wing 238 comprises wing connection member 244, which is coupled to second wing side 242. While wing connection member 244 is shown as a separate component, wing connection member 244 may be integrated into wing 238 in some cases. Wing connection member may be all or part of any releasable mechanism, such as those previously described. In FIG. 2B, wing connection member 244 is shown as a rail of the track-and-rail system.

Wing module 236 can be releasably secured to rotor module 212. In FIG. 2B, wing module 236 is releasably secured to rotor module 212 by coupling the rail of wing connection member 244 to the track of second rotor connection member 232, which is illustrated using second arrow 248.

Wing module 236 additionally comprises fourth releasable cable connection joint 246. Fourth releasable cable connection joint 246 comprises all or part of a releasable cable connection system, such as those previously described. While fourth releasable cable connection joint 246 is illustrated as part of wing connection member 244, it can be placed at any location on wing module 236.

When wing module 236 is secured to rotor module 212, communication can be established between components of wing module 236 and rotor module 212 by connecting third releasable cable connection joint 234 to fourth releasable cable connection joint 246. In this way, components of wing module 236 (such as flaps, elevators, ailerons, rudder, etc.) can establish communication with components of rotor module 212 and with components of body module 200, when body module 200 and rotor module 212 are connected using first releasable cable connection joint 210 and second releasable cable connection joint 230. In an embodiment, wing module 236 is configured to operate independently, as will be further described.

It will be understood that the modules provided in FIGS. 2A-2C are examples. Other modular configurations are suitable for use with aspects of the present technology. In a particular example, rotor modules and wing modules are each independently operable. That is, a rotor module in this example includes components that allow the rotor module to operate independently, meaning that the rotor module, without the support of other modules, can engage in flight to deliver a parcel. For example, the rotor may include any combination of a battery location having a battery connection member or a battery, flight controller, power distribution device, communication transmitter and receiver, a parcel carrier that transports the parcel during flight, and the like.

Similarly, in this example, the wing module can also be independently operable. Here, the wing module may also include components that allow it to operate without the support of other modules to deliver a parcel. That is, the wing module includes any combination of a battery location having a battery connection member or a battery, flight controller, power distribution device, communication transmitter and receiver, a parcel carrier, and the like.

In an example, the independently operable wing module and rotor module can each carry a cargo container. The cargo container may also be utilized with any other embodiment of the technology. For instance, the cargo container can be used with modules, such as the wing module, rotor module, and body module, when the modules work in conjunction with one another or independently of one another. The cargo container provides additional protection for the parcel by encasing the parcel, at least partially or fully, within the cargo container.

In one example, the cargo container includes a battery for use by the wing module or the rotor module. In this way, a parcel can be preloaded into the cargo container along with a charged battery. This is beneficial for rapidly reloading parcels for delivery. Since battery power is depleted during delivery of a parcel, the inclusion of the battery in the cargo container allows one or more of the modules to be simultaneously loaded with a new parcel and a charged battery, therefore allowing the one or more modules to be immediately available for transport of a second parcel.

The cargo container can be secured to the rotor module, the wing module, or the body module. The cargo container can be used with any configuration of these modules, or with an independently operable module. A track and rail system is one example system suitable for use in securing the cargo container to any of the UAV modules. However, any other securing system described herein can be utilized. One example cargo container suitable for use will be further described in more detail with reference to FIG. 6.

It will be understood that, in some configurations of modules, multiple batteries will be employed. For instance, a battery can be included in the cargo container, within a body module, the rotor module, the wing module, or in any combination. In such configurations, a flight controller can be employed to balance power between each of the batteries so that each is utilized equally. In another example, the flight controller draws power from one particular battery, so as to conserve battery power in other batteries.

Turning now to FIG. 2C, which illustrates yet another example configuration of the modular UAV system. Here, wing module 236 is being secured to body module 200 using wing connection member 244 and second rotor connection member 232, as illustrated by third arrow 250. Communication is established from components of wing module 236 to components of body module 200 by connecting first releasable cable connection joint 210 to fourth releasable cable connection joint 246. Thus, for example, flaps, ailerons, rudder, etc. of wing module 236 can communicate with and receive instructions from an on-board computing device within body housing 202.

Although first through fourth releasable cable connection joints (210, 230, 234, 246) are shown as a single unit, each may comprise various cables, for example, a power cable from the power distribution device to the ESCs may be different than the communication cables from an on-board computing device to the ESCs. These may each connect using a single unit or may connect through various units. All of which are intended to be within the scope of first through fourth releasable cable connection joints (210, 230, 234, 246). Further, while each of first through fourth releasable cable connection joints (210, 230, 234, 246) are shown located on or integrated with their respective components, first through fourth releasable cable connection joints (210, 230, 234, 246) may be located external to each of these components and communicate using a cable. For example, first releasable cable connection joint 210 may be located external to body housing 202 and communicate to components within body housing 202, such as on-board computing device, etc., using a cable. Likewise, this can apply to any of fourth releasable cable connection joints (210, 230, 234, 246).

Figure 3A:
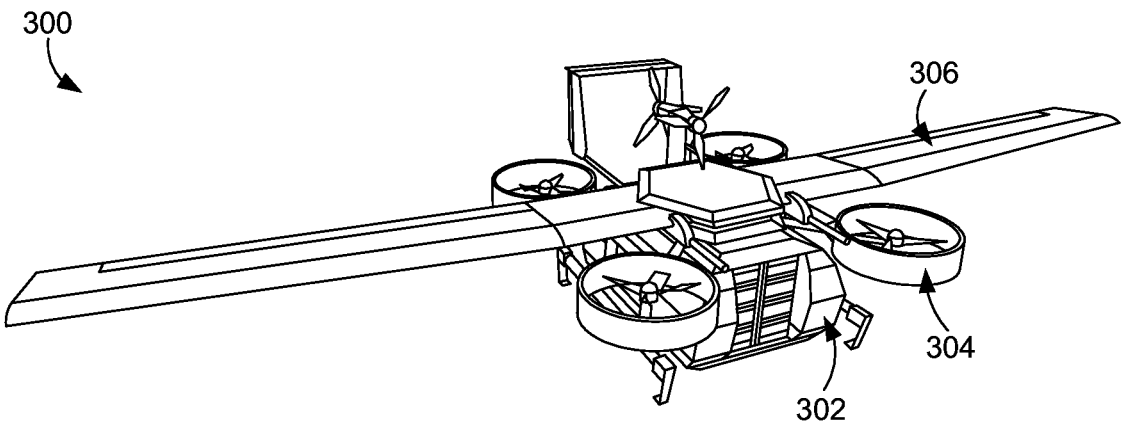
FIGS. 3A-3C illustrate example configurations formed from modules of an example modular UAV system, in accordance with an aspect described herein.
Figure 3B:
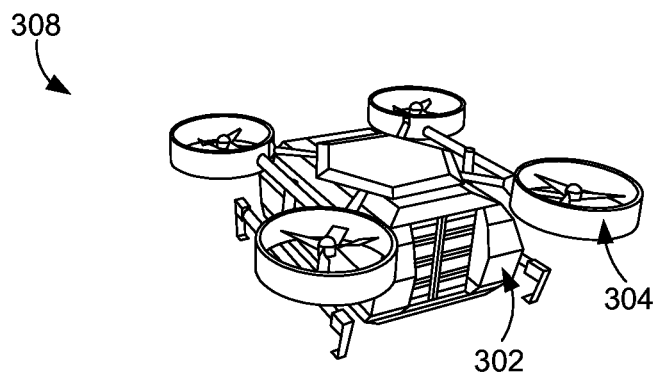
Figure 3C:
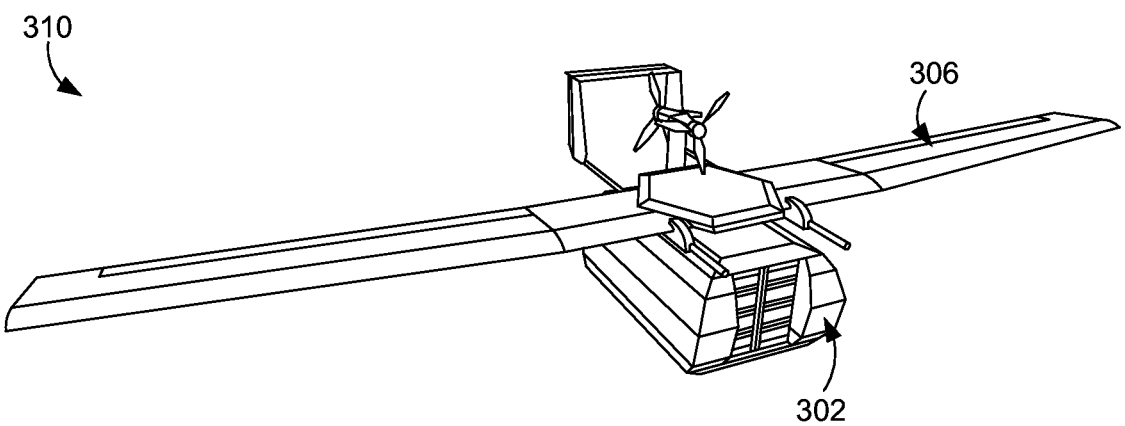

Turning now to FIGS. 3A-3C, example configurations formed from modules of an example modular UAV system are provided. Each of these configurations may be formed by the modular UAV system provided in FIGS. 2A-2C. Each of the modules can host any combination of components described herein, including components that allow each module to operate independently.

FIG. 3A illustrates first configuration 300 of the modular UAV system. Here, body module 302 is releasably secured to rotor module 304. Rotor module 304 is further releasably secure to wing module 306.

FIG. 3B illustrates second configuration 308 of the modular UAV system. Here, body module 302 is releasably secured to rotor module 304.

FIG. 3C illustrates third configuration 310 of the modular UAV system. Here, body module 302 is releasably secured to wing module 306.

In an exemplary embodiment, a method of assembling a modular unmanned aerial vehicle (UAV) system comprises coupling a first rotor connection member of a rotor module to a body connection member of a body module. Referring to FIG. 2A, the body connection member 208 of the body module 200 is releasably coupled to the first rotor connection member 228 as indicated by first arrow 252. In further embodiments, a first releasable cable connector joint 210 is coupled to a second releasable cable connector joint 230. By connecting the first releasable cable connector joint 210 to the second releasable cable connector joint 230, communication between the body module and the rotor module is facilitated. For example, this allows for communication between a battery located within or affixed to the body module, and electronic speed controllers of the rotor module.

In further embodiments, as illustrated in FIG. 2B, the method of assembly comprises releasably coupling a second rotor connection member 232 to a wing connection member 244. This method may further comprise coupling a third releasable cable connection joint 234 to a fourth releasable cable connection joint 246. By coupling these releasable cable connections, communication is enabled between the rotor module 212 and the wing module 236. In embodiments in which each of the wing module 236, rotor module 212, and the body module 200 are releasably coupled together, the connection of the respective releasable cable connection joints allow for communication across all connected modules. For example, if the wing module is communicatively coupled to the rotor module and the rotor module is communicatively coupled to the body module, the body module would be able to communicate with and give instructions to the wing module.

Figure 4:
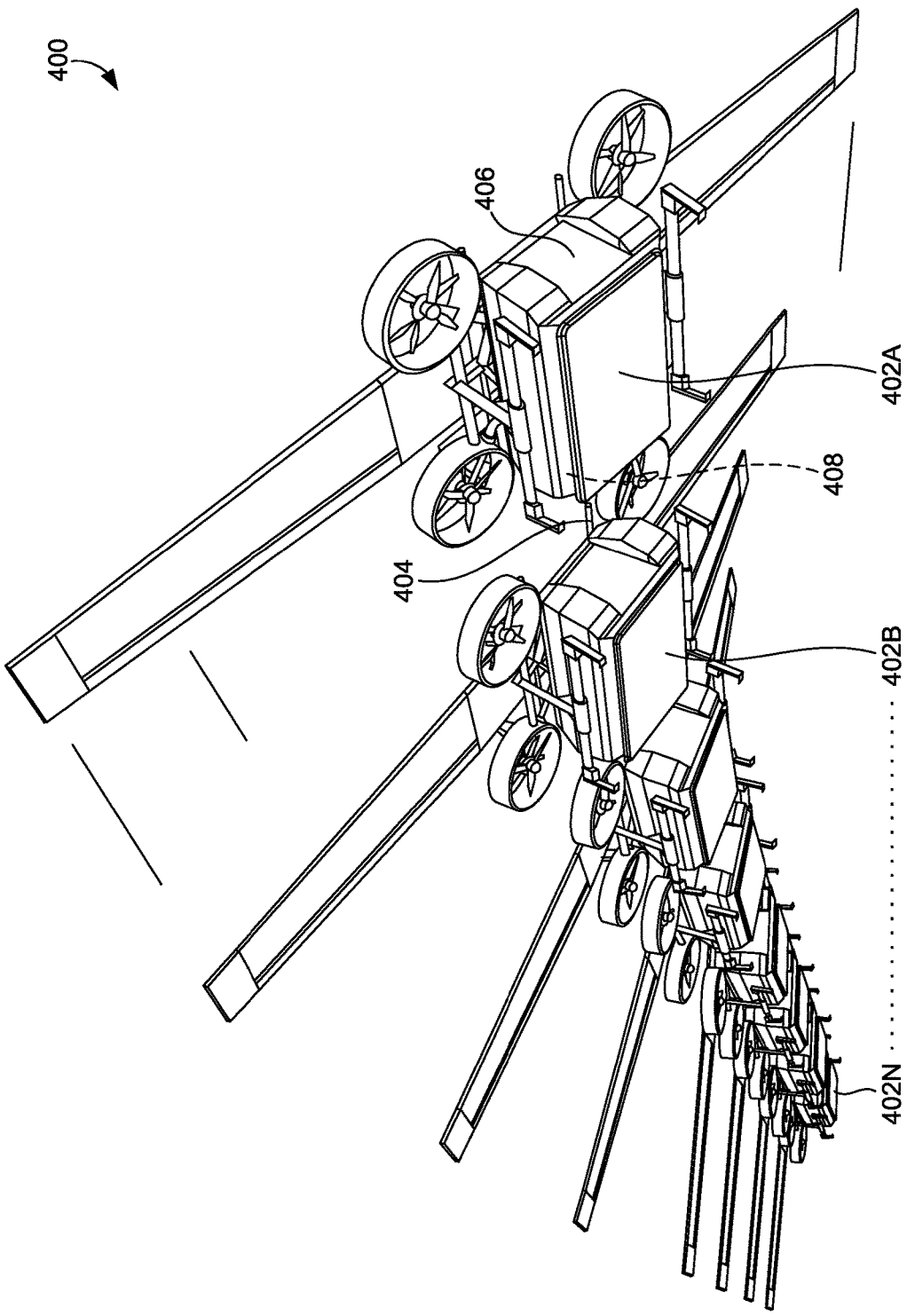
FIG. 4 illustrates an example flight arrangement using a plurality of UAVs, in accordance with an aspect described herein.

Turning now to FIG. 4, which provides an example flight arrangement 400 using a plurality of UAVs. The example illustrated is one example of a "flight chain." Flight arrangement 400 provides for advanced methods of parcel delivery. As illustrated, in FIG. 4, the flight arrangement includes a plurality of UAVs 402A-402N. By using "402A-402N," FIG. 4 is intended to illustrate that the plurality of UAVs in the flight arrangement can include any number. An aspect of the modular UAVs described throughout this disclosure may be used. However, this arrangement is not limited to modular UAV systems.

Here, each UAV of the plurality includes a tether, such as tether 404 of UAV 402A. In an aspect, each UAV can have two tethers. Each tether is attached to its respective UAV at a joint. Examples of suitable joints include ball, hinge, knuckle, turnbuckle, cotter, pivot, bolted, and screw, among others. A tether can be attached at a front end of a UAV, at a back end of a UAV, or both, such as when two tethers are used. FIG. 4 illustrates UAV 402A as having front end 406 and back end 408. Tethers may be attached rotatably about a joint, which allows a first tethered UAV to move independent of a second tethered UAV when tethered.

In some cases, tethers further comprise buses to permit communication and power between UAVs of a UAV flight chain. As previously discussed, where multiple batteries are employed, battery power can be balanced during operation of the UAVs. In other embodiments, specific UAVs of the UAV flight chain provide battery power across the flight chain. This may be beneficial for UAVs of the flight chain that have short delivery distances, allowing utilization of their battery power prior to utilizing battery power of UAVs that have relatively longer distances to travel when delivering parcels. That is, battery power of a first UAV of the flight chain can be used prior to the battery power of a second UAV of the flight chain, where the second UAV has a second delivery destination that is a greater distance than a first delivery destination of the first UAV. The buses may further allow communication between UAVs in addition to or in lieu of their wireless communication abilities. This may increase response time when the UAVs operate within the flight chain.

In an aspect where one tether is employed on a UAV, the tether is attached at the front end. Alternatively, the tether can be attached at the back end. In an aspect where two tethers are employed, each tether is attached at the front end and the back end.

When a single tether system is employed, each UAV further has a harness point. The harness point includes a point at which a tether of another UAV releasably engages. By engaging the tether of one UAV with another UAV, a UAV flight chain is formed, such as the one shown in flight arrangement 400. In flight arrangement 400, UAV 402A comprises tether 404 that is attached at back end 408 at a joint. Tether 404 is in an engaged position with UAV 402. Tether 404 can be released so that it is in a disengaged position. When releasably coupled to a harness point in an engaged position, tethers may be rotatable about the harness point.

When disengaged, the flight chain is broken and UAV 402A and UAV 402B may act independently, that is, they each may engage in asynchronous movement and travel. When engaged, UAV 402A and UAV 402B perform synchronous movements and travel. By synchronous, it does not mean that each performs an action at the same time, but rather, synchronous movement acts to accomplish a single goal. For example, the flight chain may receive instructions to turn left. Here, UAV 402A can begin to roll toward the left, subsequently followed by UAV 402B rolling left. While each does not roll left at the same time, each rolls in a manner to advance the flight chain to move toward the left direction. This is considered synchronous movement. Thus, asynchronous movement may occur when movements do not act to accomplish the same task, for example, to move in two different directions.

In the embodiment where UAVs include two tethers, each tether is secured to its respective UAV at a joint, while the opposite end includes a harness point. For example, a tether is secured to a UAV front end at a first end of the tether. The tether extends from the first end to a second end opposite the first end. The second end comprises the harness point. Each harness point for UAVs in this embodiment releasably engages to harness points of tethers on other UAVs.

Tethers can be disengaged from harness points during flight. In this way, UAVs may navigate synchronously using a flight chain. They may disengage individually or in groups to begin asynchronous movements.

Thus, UAV flight chains can be used in methods of delivering parcels. In one method of tethered flight delivery. A plurality of UAVs is coupled using tethers. The plurality includes two or more UAVs. The plurality of UAVs forms the flight chain when coupled. Each UAV comprises a tether. In another embodiment, each UAV comprises two tethers. The tethers are coupled to harness points. Each UAV may include a harness point for releasably securing one of the tethers. In some cases, each tether includes a harness point to releasably secure each UAV to another UAV by securing a first harness point of a first tether to a second harness point of a second tether.

The flight chain can be synchronously navigated from one location to another over a distance. At any point, including during flight, one or more of the tethers is disengaged at the harness point. In this way, one UAV or a group of two or more UAVs is released from the UAV flight chain. When a group of UAVs is released as a single unit, it forms a second flight chain. A UAV flight chain has several advantages over current delivery methods. First, in a flight chain system, each of the UAVs may share energy among the other UAVs of the flight chain. Additionally, said flight chains are capable of being powered primarily by the head UAV of the flight chain. In this embodiment, this reduces the wear of the powertrain components of the other UAVs. UAV flight chains also provide the benefit of simplified flight path approvals and simplified follow up of mission progress for the Civil Aviation Authorities. This is because the plurality of UAVs of the flight chain can be treated as a single flying system while tethered.

Once released, the released UAV(s) (the single UAV, the group of UAVs, or the group of UAVs forming a single unit) can navigate asynchronously with respect to the flight chain from which it detached. Thus, the released UAV may navigate away from the flight chain to another location.

To deliver parcels, one or more parcels can be attached to the plurality of UAVs. This may be done at a parcel carrier of the UAV. An example of a parcel carrier suitable for use and methods of attaching parcels to the parcel carrier are found in U.S. patent application Ser. No. 15/582,168, entitled "Unmanned Aerial Vehicle Pick-Up and Delivery Systems," now U.S. Pat. No. 9,969,495, which is hereby incorporated by reference in its entirety. A UAV may include more than one parcel, each UAV of the flight chain may include one or more parcels, and some UAVs of the flight chain may not have an attached parcel. In one loading method, parcels are attached to the UAVs to balance the flight chain. Relatively heavier parcels, that is, a parcel that has greater weight than another parcel of the plurality, may be attached toward the center of the flight chain. Lighter parcels are attached toward flight chain ends. In one example, the lightest parcel of the plurality is attached to an end UAV of the flight chain. A heaviest parcel is attached at a center UAV of the flight chain, which can include either one of two center UAVs in flight chains that include an even number of UAVs.

With the attached parcels, the flight chain synchronously navigates over a first distance to a first location. When at the first location, one or more of the UAVs is released from the flight chain, such that the released UAV(s) can asynchronously navigate with respect to the flight chain. The one or more UAVs are released from the flight chain by uncoupling tether units at harness points to disengage the tether units.

In some cases, a plurality of UAVs is released individually. In this case, each of the released UAVs asynchronously navigates with respect to the other released UAVs. In another case, the plurality of UAVs is released as a single unit forming a second flight chain. The second flight chain navigates asynchronously with respect to the first flight chain, e.g., the initial flight chain from which it was released. The UAVs forming the second flight chain navigate synchronously with respect to each UAV of the second flight chain.

When released, the uncoupled UAV(s) navigate away from the UAV flight chain and toward a second location. At the second location, which can include a delivery location for one or more parcels associated with the uncoupled UAVs, the parcels are released.

Another method that may be performed by UAVs, including modular UAVs, includes a controlled descent to recharge a battery. For example, a UAV that is in flight may recharge a battery by descending rapidly downward, allowing airflow to rotate its propellers, thus using an electric motor to recharge a battery.

This method can be used with UAV flight chains as well as with modular UAVs having at least one rotor module and one wing module, or two rotor modules. UAVs that expend battery power flying synchronously with other UAVs in a flight chain can be released from the chain from an altitude above the ground. These UAVs can freefall in a controlled manner to recharge an on-board battery. As it approaches the ground, it may utilize the remaining battery power gained from the controlled freefall to slow the UAV to a safe speed for landing.

In an exemplary embodiment, a method of tethered flight delivery comprises coupling a plurality of unmanned aerial vehicles (UAVs) to form a UAV flight chain. Each of the plurality of UAVs comprise a tether unit, and the UAVs are coupled together by engaging the tether units of each UAV to the tether units of the other UAVs. A plurality of parcels are attached to the plurality of UAVs which form the UAV flight chain, and the UAV flight chain is navigated over a first distance to a first location. Once the UAVs have arrived at a location proximate to the first location, a UAV is uncoupled from the UAV flight chain by disengaging an engaged tether unit, the uncoupled UAV having a parcel of the plurality of parcels attached thereto. The uncoupled UAV is navigated away from the UAV flight chain to a second location, and the parcel is released at the second location.

Figure 5:
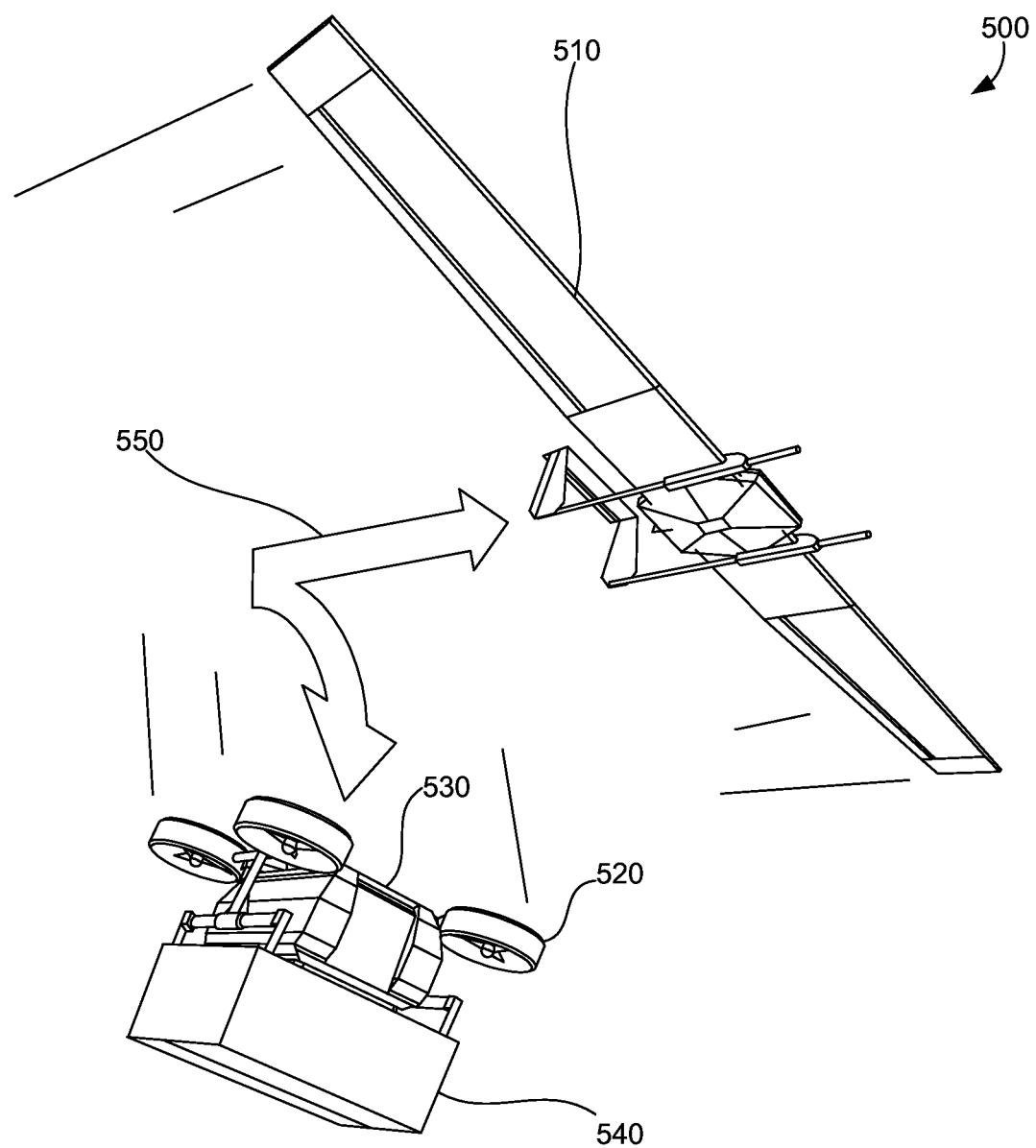
FIG. 5 illustrates an example flight method using a UAV, in accordance with an aspect described herein.

Turning now to FIG. 5, an illustration of an example delivery method using a modular UAV is provided. Here, a modular UAV delivery system 500 using a wing module 510, a body module 530, and a rotor module 520 is shown working in conjunction to deliver a parcel 540. In an embodiment, the wing module 510 can be self-propelled with a wing motor attached to the wing module (not illustrated). In another embodiment, the wing module may act as a glider without the use of a self-propelling motor.

As previously discussed, the wing module 510 can be releasably secured to one or more of the body module 530 or the rotor module 520. In this way, the system works in conjunction to deliver a parcel 540. In an example method, the parcel 540 is secured to the body module 530 or the wing module 510. In a first arrangement, the wing module 510 is secured to the body module 530 or the rotor module 520 carrying the parcel 510. The combined system of the wing module 510, rotor module 520, and the body module 530 is provided with instructions to deliver the parcel 540 to a delivery location. The combined system navigates to the delivery location in accordance with the instructions.

At an altitude above the delivery location, the wing module 510 is released from the body module 530 and the rotor module 520 having the parcel 540, as indicated by arrow 550. After the release, the wing module 510 navigates, using its motor or by gliding, to an end location where it may be retrieved. After the release, the body module 530 and the rotor module 520 carrying the parcel 540 navigate to the delivery location and releases the parcel 540. In some cases, the rotor module 520 and the body module 530 remain at the delivery location awaiting pickup. In an aspect, the body module 530 or the rotor module 520 emits a navigational beacon that transmits its location, such as a GPS location signal. In this way, the modules may be retrieved, for example, by a delivery carrier. In another aspect, the body module 530 and the rotor module 520 navigate away from the delivery location using a power source (e.g., power source 207 of FIG. 2A) associated with the modules. The modules may navigate away to the same end location or may navigate away to a second end location that is different from the first. Using this method, the wing module 510 may be navigated away from the delivery location prior to delivery of the parcel 540 in which the parcel 540 is released at the delivery location, while the rotor module 520 and the body module 530 navigate away from the delivery location after delivery of the parcel 540, in which the parcel 540 has been released at the delivery location.

This method is beneficial because it provides the benefit of forward flight along with the benefits of VTOL and enhanced navigation at low altitudes using the VTOL-style UAV. In an aspect, the wing module 510, because it is released at a high altitude, such as up to 400 ft, can use minimum power or glide to a location away from the delivery location. It is lighter in weight without other modules, and therefore, may glide over significant distances. The body module 530 and the rotor module 520, following the delivery, may navigate to the nearest carrier vehicle for docking and return to the carrier.

Figure 6:
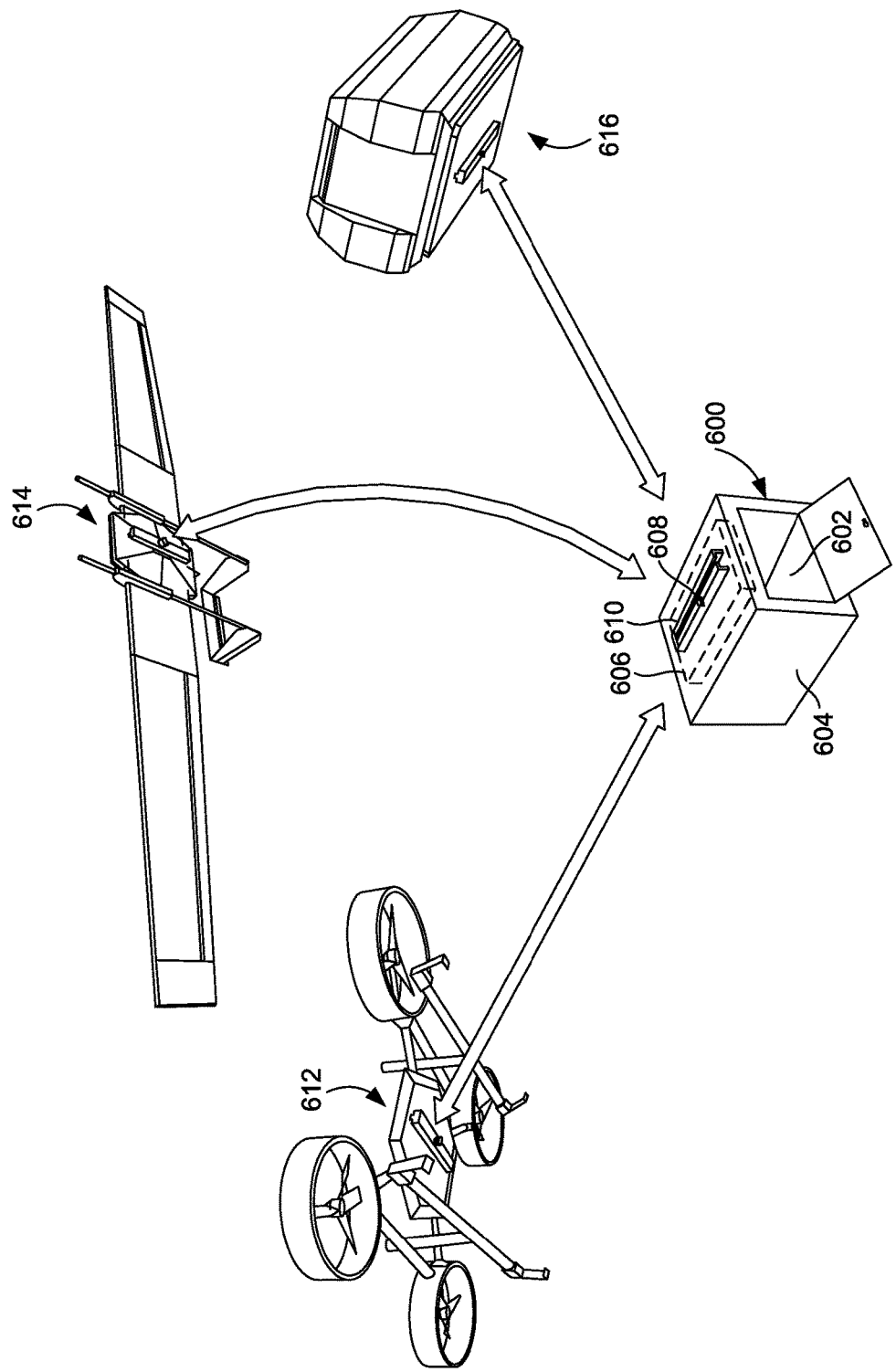
FIG. 6 illustrates an example modular UAV system for use with an example cargo container, in accordance with an aspect described herein.
Figure 7:
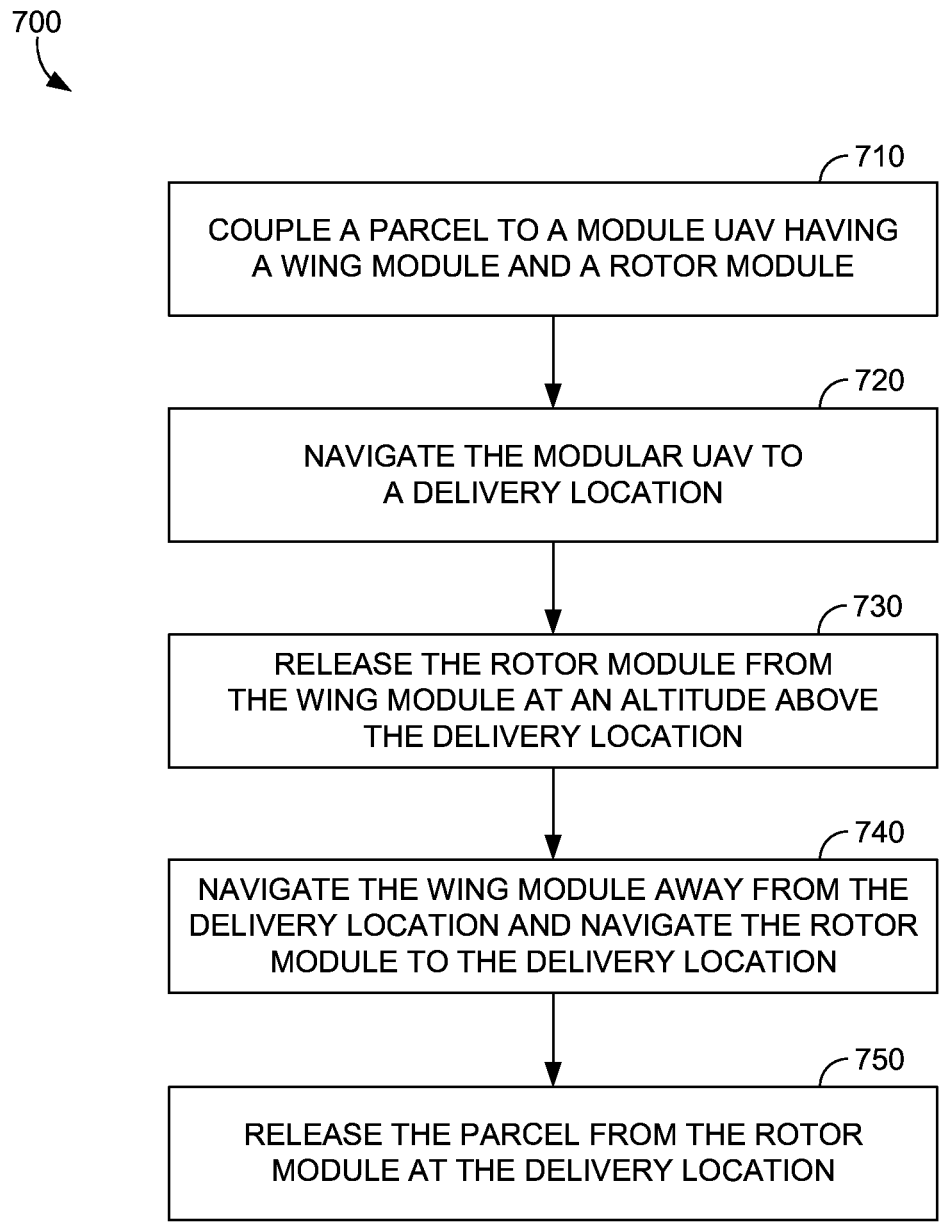
FIG. 7 is a flow diagram illustrating an example method that can be performed using embodiments of a modular UAV system, in accordance with an aspect described herein.

With reference now to FIG. 6, an example modular UAV system is provided. The example modular UAV system of FIG. 6 is suitable for use with an example cargo container 600. Cargo container 600 includes interior area 602 and external case 604. A parcel can be partially or fully encased within interior area 602 by external case 604.

Cargo container 600 is illustrated as having battery 606 disposed within interior area 602. While shown within interior area 602, it is contemplated that battery 606 can be integrated within the construction of cargo container 600 or coupled to external case 606. Battery 606 communicates with other components of the modular UAV system, such as a power distribution device, through battery connection joint 608.

Cargo container 600 can be secured to any module of the modular UAV system. As discussed, one example method for securing cargo container 600 includes a track-and-rail system. As illustrated in FIG. 6, cargo container 600 includes rail 610 of the track-and-rail system. Rail 610 can be used to secure cargo container 600 to rotor module 612, wing module 614, or body module 616. As described throughout, each of the modules of the modular UAV system can be arranged in various configurations to perform particular tasks. Cargo container 600 can be secured to any of these configurations.

With reference now to method 700, an example method of delivering parcels utilizing embodiments of a modular UAV system is provided. At block 710, a parcel is coupled to the modular UAV system. The UAV system can comprise any combination of a wing module, a rotor module, or a body module. The wing module or rotor module may be independent, or may include any combination of components for use in various modular configurations. The parcel may be coupled to the modular UAV system at a parcel carrier or a cargo container secured to any of the modules. At block 720, the modular UAV system is navigated to a delivery location. At block 730, a rotor module is released from a wing module of the modular UAV system at an altitude above the delivery location. At block 740, the wing module is navigated away from the delivery location, while the rotor module is navigated to the delivery location. At block 750, the parcel is released at the delivery location by the rotor module and the rotor module is navigated away from the delivery location.

Figure 8:
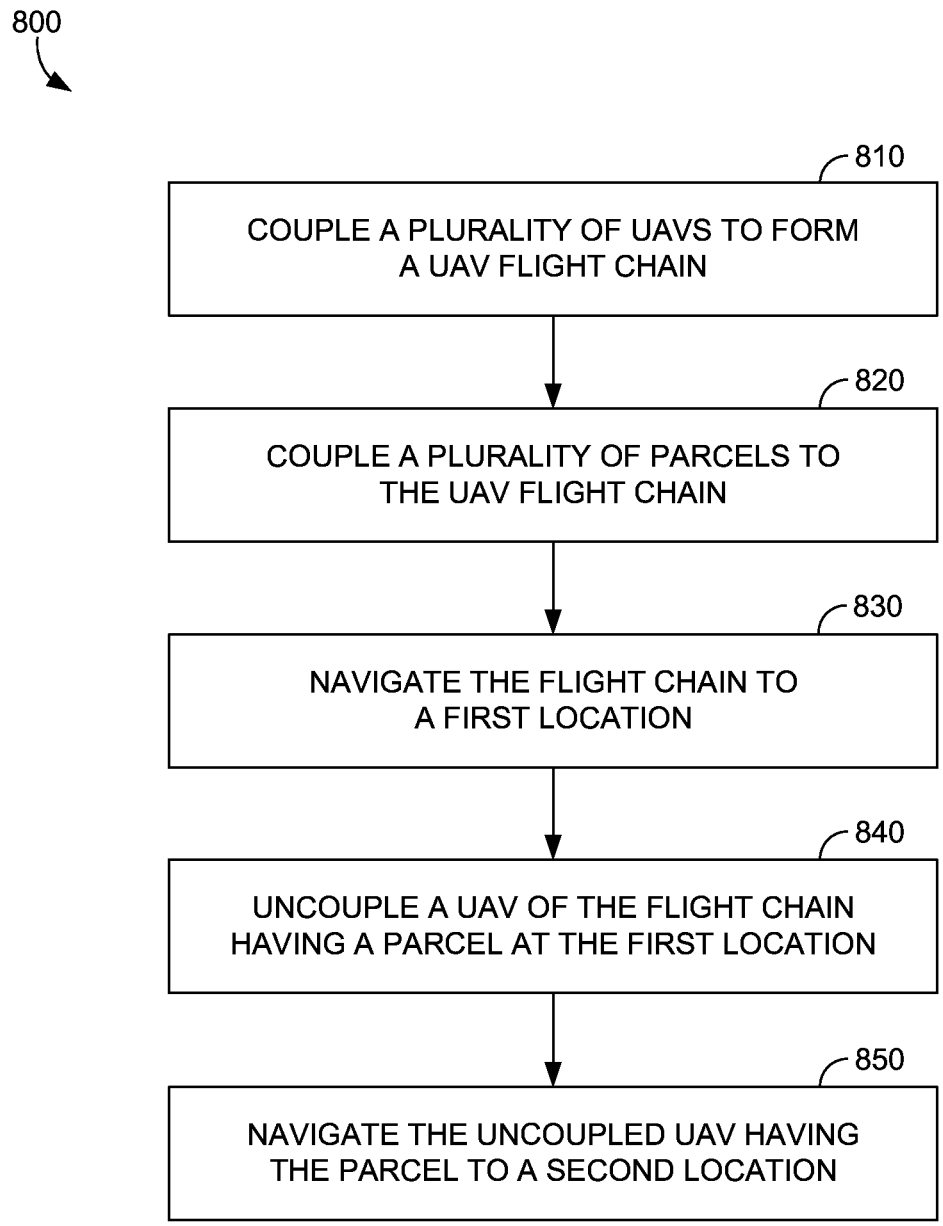
FIG. 8 is a flow diagram illustrating another example method that can be performed using embodiments of a modular UAV system, in accordance with an aspect described herein.

FIG. 8 illustrates another example method of delivering parcels using embodiments of a modular UAV system. At block 810, a plurality of UAVs is coupled to form a UAV flight chain. At block 820, a plurality of parcels is coupled to the UAV flight chain. At block 830, the UAV flight chain is navigated to a first location. At block 840, a UAV having a parcel is uncoupled from the UAV flight chain. At block 850, the uncoupled UAV having the parcel is navigated to a second location where the parcel is released.

Figure 9:
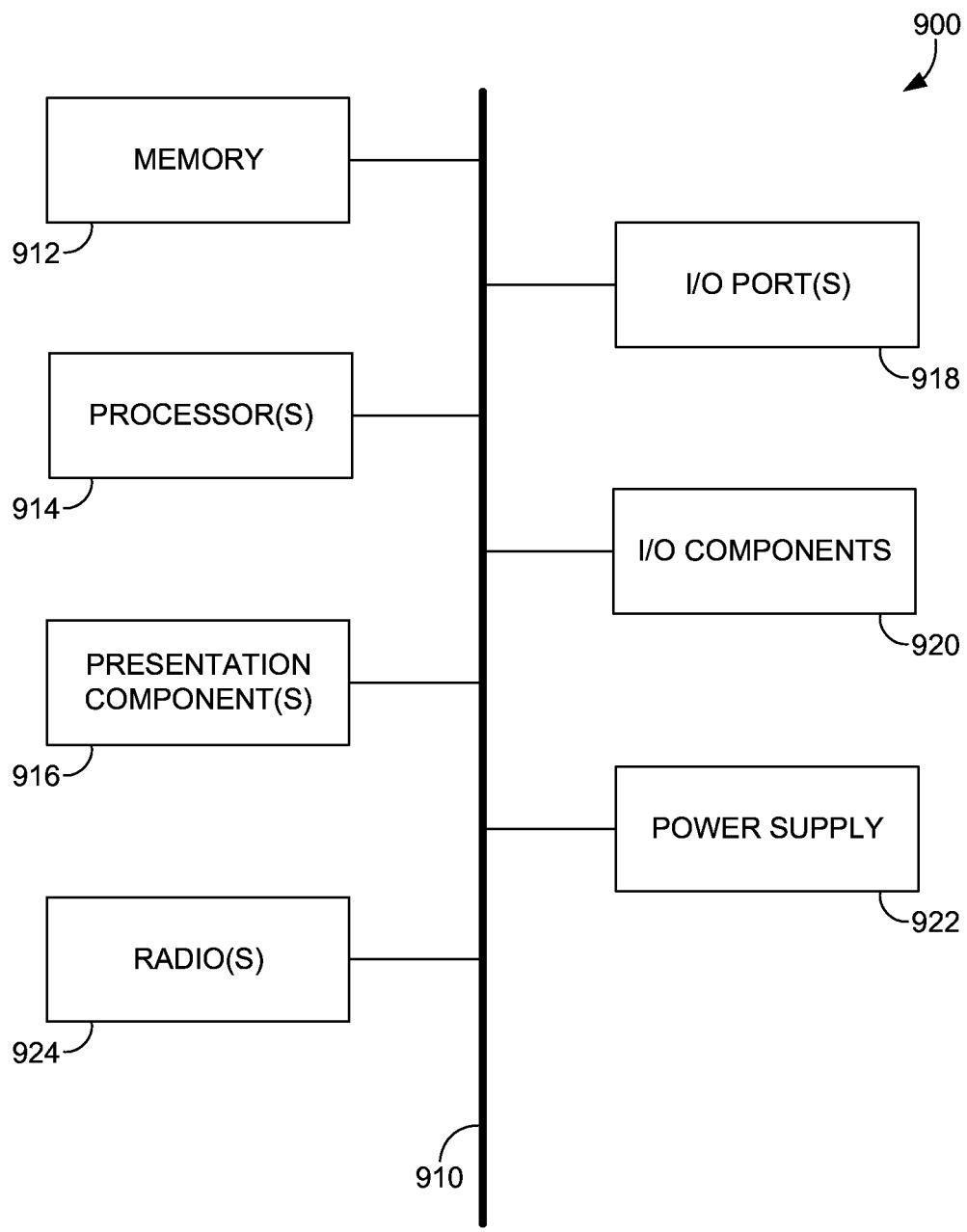
FIG. 9 illustrates an example computing device suitable for use with the disclosed technology; in accordance with an aspect described herein.

Referring now to FIG. 9, in particular, an example computing device 900 is provided. Computing device 900 should not be interpreted as having any dependency or requirement relating to any one or combination of components illustrated.

The technology of the present disclosure may include a processor executing computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, illustrative power supply 922, and one or more radios 924. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrates an example computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile or nonvolatile memory. The memory may be removable, non-removable, or a combination thereof. Example hardware devices include solid-state memory, hard drives, optical-disc drives, etc. Computing device 900 includes one or more processors that read data from various entities such as memory 912 or I/O components 920. Presentation component(s) 916 present data indications to a user or other device. Examples of presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location. Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A modular unmanned aerial vehicle (UAV) system comprising:
   a configuration of motors;
   a body module comprising a flight controller and a body connection member, wherein the body connection member comprises a first releasable cable connection joint;
   a rotor module comprising a first rotor connection member and a rotor connection hub, wherein:
      the first rotor connection member comprises a second releasable cable connection joint,
      the rotor connection hub is configured to accommodate the configuration of motors for the UAV system,
      the body connection member is configured to be removably coupled to the first rotor connection member, and
      the configuration of motors comprises a plurality of arms that removably connects to the rotor connection hub to enable a respective motor of the configuration of motors coupled to each arm of the plurality of arms to be automatically identified and enabled by the flight controller; and
   a wing module and a plurality of wings, wherein:
      the wing module comprises a wing connection member comprising a fourth releasable cable connection joint,
      the wing module is configured to accommodate the plurality of wings for the UAV system,
      the rotor module comprises a second rotor connection member comprising a third releasable cable connection joint and the wing connection member is configured to be removably coupled to the second rotor connection member,
      the plurality of wings is configured to removably connect to the wing connection member to enable the plurality of wings to be automatically identified and enabled by the flight controller, and
      the body connection member is configured to be removably coupled to the first rotor connection member and the second rotor connection member is configured to be removably coupled to the wing connection member to connect the first releasable cable connection joint to the second releasable cable connection joint and the third releasable cable connection joint to the fourth releasable cable connection joint to establish communication between the flight controller and the plurality of wings.

2. The UAV system of claim 1, wherein the plurality of arms for the configuration of motors comprises a unique combination of at least one of a certain number of arms and motors or a certain size of motors.

3. The UAV system of claim 1, wherein at least one of the body module or the rotor module comprises a battery and the motor for each arm of the plurality of arms is configured to be automatically powered by the battery.

4. The UAV system of claim 1, wherein the rotor module comprises a plurality of electronic speed controllers, each electronic speed controller of the plurality of electronic speed controllers is paired with an arm of the plurality of arms to control a speed of the motor coupled to the arm.

5. The UAV system of claim 1, wherein the plurality of wings comprises a unique combination of at least one of a certain number of wings, a certain size of wings, or a certain design of wings.

6. The UAV system of claim 1, wherein at least one of the body module, the rotor module, or the wing module comprises a battery and the plurality of wings is configured to be automatically powered by the battery.

7. A modular unmanned aerial vehicle (UAV) system comprising:
   a configuration of motors
   a body module comprising a flight controller and a body connection member; and
   a rotor module comprising a rotor connection member and configured to accommodate the configuration of motors for the UAV system, wherein:
      the body connection member is configured to be coupled to the rotor connection member so that the rotor module is stacked on top of the body module,
      the configuration of motors comprises a plurality of arms that removably connects to the rotor module to enable a respective motor of the configuration of motors coupled to each arm of the plurality of arms to be automatically identified and enabled by the flight controller.

8. The UAV system of claim 7, wherein the plurality of arms for the configuration of motors comprises a unique combination of at least one of a certain number of arms and motors or a certain size of motors.

9. The UAV system of claim 7, wherein:
the body module comprises a first releasable cable connection joint,
the rotor module comprises a second releasable cable connection joint, and
the body module is configured to be coupled to the rotor module to connect the first releasable cable connection joint to the second releasable cable connection joint to establish communication between the flight controller and the plurality of arms.

10. The UAV system of claim 7, wherein the rotor module comprises a plurality of electronic speed controllers, each electronic speed controller of the plurality of electronic speed controllers is paired with an arm of the plurality of arms to control a speed of the motor coupled to the arm.

11. The UAV system of claim 7 further comprising a wing module and a plurality of wings, the wing module configured to accommodate the plurality of wings for the UAV system, wherein:
the wing module is configured to be coupled to the rotor module, and
the plurality of wings removably connects to the wing module to enable the plurality of wings to be automatically identified and enabled by the flight controller.

12. The UAV system of claim 11, wherein the plurality of wings comprises a unique combination of at least one of a certain number of wings, a certain size of wings, or a certain design of wings.

13. The UAV system of claim 11, wherein:
the body module comprises a first releasable cable connection joint,
the rotor module comprises a second releasable cable connection joint,
the rotor module comprises a third releasable cable connection joint,
the wing module comprises a fourth releasable cable connection joint, and
the body module is configured to be coupled to the rotor module and the rotor module is configured to be coupled to the wing module to connect the first releasable cable connection joint to the second releasable cable connection joint and the third releasable cable connection joint to the fourth releasable cable connection joint to establish communication between the flight controller and the plurality of wings.

14. A method of assembling a modular unmanned aerial vehicle (UAV) system, the method comprising:
connecting a plurality of arms for a configuration of motors to a rotor module of the UAV system;
coupling a first rotor connection member of the rotor module of the UAV system to a body connection member of a body module of the UAV system to stake the rotor module on top of the body module, wherein:
the body module comprises a flight controller; and
automatically identifying and enabling, by the flight controller, a respective motor of the configuration of motors coupled to each arm of the plurality of arms.

15. The method of claim 14 further comprising:
coupling a second rotor connection member of the rotor module to a wing connection member of a wing module of the UAV system;
coupling a plurality of wings to the wing module, wherein:
the wing module is configured to accommodate the plurality of wings for the UAV system; and
automatically identifying and enabling, by the flight controller, the plurality of wings.

* * * * *